O. S. WATROUS.
Mouse-Traps.

No. 154,432. Patented Aug. 25, 1874.

Witnesses.
John Pollitt
W. H. Hosmer

Inventor
Oliver S. Watrous
By W. E. Simonds
Atty.

UNITED STATES PATENT OFFICE.

OLIVER S. WATROUS, OF UNIONVILLE, CONNECTICUT.

IMPROVEMENT IN MOUSE-TRAPS.

Specification forming part of Letters Patent No. 154,432, dated August 25, 1874; application filed June 2, 1874.

*To all whom it may concern:*

Be it known that I, OLIVER S. WATROUS, of Unionville, in the county of Hartford and State of Connecticut, have invented certain new and useful Improvements in Mouse-Traps, of which the following is a specification, reference being had to the accompanying drawings, where—

Figure 1:
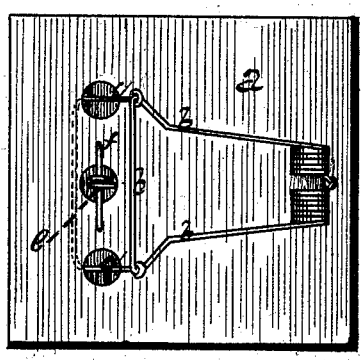
Figure 2:
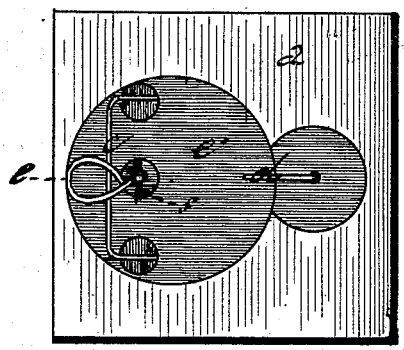
Figure 3:
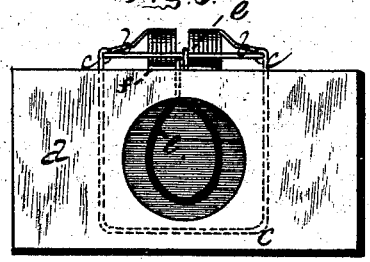
Figure 4:
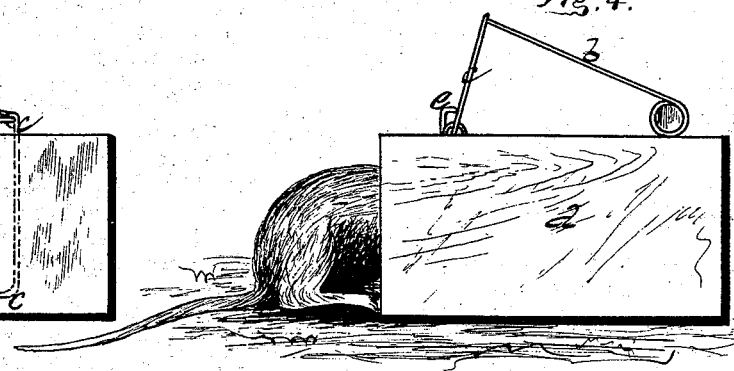

Figure 1 is a top view of my improved trap unset. Fig. 2 is a bottom view of the same. Fig. 3 is a front view of the same, set. Fig. 4 is a side view of the trap unset.

The improvement is an arrangement in mouse-traps, whereby the mouse is made to spring the trap as he pushes for the bait.

The letter $a$ indicates the common wooden block forming the body of the trap; $b$, the common spring-saddle, and $c$ the common choker.

In almost all the varieties of mouse-traps of this general nature heretofore in use the bait has been placed at the lower end of a tripping-wire, the upper end of which has been made to catch upon the spring-saddle when the trap has been set, and the mouse had to pull on the bait to spring the trap. Often the bait would pull off the hook without springing the trap, and sometimes no pull a mouse could give would spring it. I avoid these difficulties by putting the bait on the hook $d$ at the rear of the hollow space $e'$, always made in the under side of the trap, and then so adjusting the trip-wire $e$ that a push upon its lower end will spring the trap. This trip-wire is pivoted on the cross-wire $f$, and the upper end is so hooked as to point to the rear, so that it requires a push inward upon the lower end to trip the hook and spring the trap.

I prefer that the lower end of the trip-wire should be looped, as shown, so that, when the mouse goes for the bait behind it, he will attempt to push through the loop, and thus spring the trap; but this is not absolutely essential.

I claim as my invention—

The combination of the block $a$, the spring-saddle $b$, choker $c$, trip-wire $e$, looped at the bottom, and made to trip by pushing inward, and the bait-hook $d$, separate from and behind the trip-wire, all combined and arranged to operate substantially as shown and described.

OLIVER S. WATROUS.

Witnesses:
WM. E. SIMONDS,
JOHN POLLITT.